US007991786B2

(12) United States Patent
Fontoura et al.

(10) Patent No.: US 7,991,786 B2
(45) Date of Patent: Aug. 2, 2011

(54) USING INTRA-DOCUMENT INDICES TO IMPROVE XQUERY PROCESSING OVER XML STREAMS

(75) Inventors: Marcus Felipe Fontoura, San Jose, CA (US); Vanja Josifovski, Los Gatos, CA (US); Pratik Mukhopadhyay, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 1713 days.

(21) Appl. No.: 10/723,391

(22) Filed: Nov. 25, 2003

(65) Prior Publication Data

US 2005/0114316 A1    May 26, 2005

(51) Int. Cl.
*G06F 17/30* (2006.01)
(52) U.S. Cl. ............... 707/771; 707/741; 707/769
(58) Field of Classification Search ............ 707/104, 707/104.1, 1–3, 741, 769, 771
See application file for complete search history.

(56) References Cited

U.S. PATENT DOCUMENTS

| | | | |
|---|---|---|---|
| 6,418,448 B1 | 7/2002 | Sarkar | |
| 2001/0037345 A1 | 11/2001 | Kiernan et al. | |
| 2002/0073399 A1 | 6/2002 | Golden | |
| 2002/0078068 A1 | 6/2002 | Krishnaprasad et al. | |
| 2002/0099687 A1* | 7/2002 | Krishnaprasad et al. | 707/1 |
| 2003/0159112 A1* | 8/2003 | Fry | 715/513 |
| 2004/0073541 A1* | 4/2004 | Lindblad et al. | 707/3 |
| 2005/0055334 A1* | 3/2005 | Krishnamurthy | 707/2 |
| 2005/0055343 A1* | 3/2005 | Krishnamurthy | 707/3 |

FOREIGN PATENT DOCUMENTS

WO    WO 02/21339 A2    3/2002

OTHER PUBLICATIONS

Brownell, SAX2: PRocessing XML Efficiently with Java, Jan. 2002, O'Reilly Press, p. 1-5, 8-9, 40-41, 60-62, 96-99,112-113, 190-191.*
Harold, "An Introduction to StAX", Sep. 2003, XML.com, p. 1-8, <Retrieved from http://web.archive.org/web/20031008105356/www.xml.com/lpt/a/2003/09/17/stax.html>.*
Bea, "Streaming API for XML JSR-173 Specification", Oct. 8, 2003, BEA Systems, Java Community Process, Retrieved from <http://ftpna2.bea.com/pub/downloads/jsr173_1.0.pdf> on Jan. 15, 2008.*

(Continued)

*Primary Examiner* — Khanh B Pham
(74) *Attorney, Agent, or Firm* — Gibb I.P. Law Firm, LLC

(57) ABSTRACT

A system and method for parsing documents in query processing comprises producing at least one index of a document written in a mark-up language, corresponding the index to the document, scanning the document, and selectively skipping portions of the document based on instructions from the index. Furthermore, the mark-up language comprises any of HTML and XML; the skipped portions of the document comprise portions irrelevant to the query; the index comprises a plurality of elements representing textual categories of the query; and the instructions match the elements to the query. If the elements do not match the query, then the parser uses the index to skip the portions of the document corresponding to the unmatched elements. Moreover, each of the elements corresponds to a position in the document, wherein the position comprises an end position, which determines where to resume scanning the document upon skipping the portions of the document.

20 Claims, 3 Drawing Sheets

OTHER PUBLICATIONS

"Persistent DOM: An Architecture for XML repositories in relational databases", Richard Edwards, Sian Hope, Published by Springer-Verlag in Lecture Notes in Computer Science (vol. 1983), pp. 416-421, 2000.

"A General Technique for Querying XML Documents using a Relational Database System", Jayavel Shanmugasundaram, Rajasekar Krishnamurthy, Igor Tatarinov, Eugene Shekita, Efstratios Viglas, Jerry Kiernan, Jeffrey Naughton, SIGMOD Record, vol. 30, No. 3, Sep. 2001, pp. 20-26.

"Relational Databases for Querying XML Documents: Limitations and Opportunities", Jayavel Shanmugasundaram, Kristin Tufte, Gang He, Chun Zhang, David DeWitt, Jeffrey Naughton, Proceedings of the 25th VLDB Conference, Edinburgh, Scotland, 1999, 13 pages.

"Tutorial: XML Toolkit", Makoto Onizuka, V1.02, Sep. 5, 2002, http://www.cs.washington.edu/homes/suciu/XMLTK/tutorial.txt, 10 pages.

"XML pull parsing patterns", Aleksander Slominski, Version $Id:patterns.html,v 1.4, Aug. 16, 2002, http://www.extreme.indiana.edu/~aslom/xmlpull/patterns.html, 8 pages.

"Re: Streaming XML and SAX", Nathan Kurz, Feb. 27, 1999, http://lists.xml.org/archives/xml-dev/199902/msg00952.html, 3 pages.

"X marks the path", DNJ Online, Essentials—Understanding XPath, 2002, http://www.dnjonline.com/articles/essentials/iss25_essentials_xpath.asp, 5 pages.

* cited by examiner

USING INTRA-DOCUMENT INDICES TO IMPROVE XQUERY PROCESSING OVER XML STREAMS

BACKGROUND OF THE INVENTION

1. Field of the Invention

The invention generally relates to processing mark-up language data, and more particularly to a technique for reducing parsing time of documents by using intra-document indices to improve querying streams of XML data.

2. Description of the Related Art

As XML (extensible mark-up language) continues to gain popularity as a format for storing, sharing, and manipulating data, new tools and systems are being introduced to increase its flexibility. One important feature necessary to provide robust XML data processing applications involves the ability to query XML data. More specifically, with the growing popularity of streamed applications over networks such as the Internet, facilities for efficiently querying streams of XML data will become more and more critical.

Most of the XPath and XQuery implementations today process queries by traversing an in-memory representation of the document using the Document Object Model (DOM) interface. In DOM, at any point, the processing can move in any direction in the XML tree from the current node to its children, its parent or any of its siblings. While this makes the implementation easier, the requirement that the whole document be saved in memory is a major drawback of this approach, leading to large memory consumption (decreased concurrency) and high latency (the document needs to be processed before the first answer is produced). In order to overcome these limitations, streamed implementations based on the Simple API for XML (SAX) interface are emerging.

The recently developed TurboXPath processor, available from International Business Machines, NY, USA, evaluates single-document XQuery queries over streams of XML data using SAX. TurboXPath has demonstrated to reduce both the memory consumption and the latency by orders of magnitude. Nevertheless, experiments have demonstrated that XML parsing (producing SAX events from an XML document stream) is responsible for 60 to 95 percent of the overall processing time. One of the reasons for the high overhead of the parsing is that the parsers produces events for all document pieces, regardless if they are relevant for processing the query.

Conventional parsing techniques aimed at reducing parsing time when processing XQuery queries over streams of XML documents produce events for all document pieces, regardless of query relevance. U.S. patent application Ser. No. 10/413,244 filed on Apr. 14, 2003, the complete disclosure of which is herein incorporated by reference, describes a technique applicable to querying streams of XML documents. However, while the co-pending application is certainly useful and beneficial for the purposes for which it was intended, its solution involves buffering streamed fragments that meet a particular evaluation criteria and constructing these fragments in order to satisfy queries, and is not necessarily aimed at reducing parsing time. Therefore, there is a need for a novel technique that can reduce parsing time in the context of processing XQuery queries over XML documents.

SUMMARY OF THE INVENTION

In view of the foregoing, an embodiment of the invention provides a method for parsing documents in query processing, and a program storage device implementing the method, wherein the method comprises producing at least one index of a document written in a mark-up language, corresponding the index to the document, scanning the document, and selectively skipping portions of the document based on instructions from the index. Furthermore, according to the invention, the mark-up language comprises any of HTML and XML; the skipped portions of the document comprise portions irrelevant to the query; the index comprises a plurality of elements representing textual categories of the query; and the instructions match the elements to the query.

According to the invention, if the elements do not match the query, then the parser uses the index to skip the portions of the document corresponding to the unmatched elements. Moreover, each of the elements corresponds to a position in the document, wherein the position comprises an end position. Furthermore, the index uses the end position as a marker for determining where to resume scanning the document upon skipping the portions of the document. Additionally, the elements comprise sub-elements representing textual sub-categories of the query, wherein the sub-elements updates the position in the document upon skipping the portions of the document and resuming scamming of the document. The method further comprises saving the textual categories into a buffer.

In another embodiment, the invention provides a system for efficiently parsing documents in query processing, wherein the system comprises at least one index corresponding to a document written in a mark-up language, a processor operable for scanning the document, and a parser operable for selectively skipping portions of the document based on instructions from the index. Furthermore, according to the invention, the mark-up language comprises any of HTML and XML; the skipped portions of the document comprise portions irrelevant to the query; the index comprises a plurality of elements representing textual categories of the query; and the instructions match the elements to the query.

Accordingly, if the elements do not match the query, then the parser uses the index to skip the portions of the document corresponding to the unmatched elements. Moreover, each of the elements corresponds to a position in the document, wherein the position comprises an end position. Furthermore, the index uses the end position as a marker for providing the processor instructions for determining where to resume scanning the document upon the parser skipping the portions of the document. Additionally, the elements comprise sub-elements representing sub-categories of the query, wherein the sub-elements provide instructions for updating the position in the document upon the parser skipping the portions of the document and the processor resuming scanning of the document. The system further comprises a buffer operable for saving the textual categories.

In another embodiment, the invention provides a system for efficiently parsing documents in query processing, the system comprising means for producing at least one index of a document written in a mark-up language, means for corresponding the index to the document, means for scanning the document, and means for selectively skipping portions of the document based on instructions from the index.

The invention provides an index that is added to a textual XML document or stream. As opposed to some conventional binary XML representations that require modifications of the document format (such as XTalk), according to the invention the original document is left unchanged. This has three major advantages. First, to extract a piece of the document, the processor 220 does not need to recreate the result XML from the binary format. The index 210 contains information that allows for efficient extraction of elements from the original document. Second, indexing only parts of the document can control the size of the index 210. In the non-indexed parts of the documents the processing would be the same as if there were no index, with no performance penalty. For example, this is especially useful in scenarios that there is a known limit on the query depth. Third, the invention does not require any changes in parsers not supporting the use of the index. While more efficient parsers can take advantage of this index and improve the performance, traditional parsers can simply ignore the index and function as intended.

These and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which:

FIG. 2(*b*) is a system diagram according to an embodiment of the invention.

DETAILED DESCRIPTION OF PREFERRED EMBODIMENTS OF THE INVENTION

Figure 1:
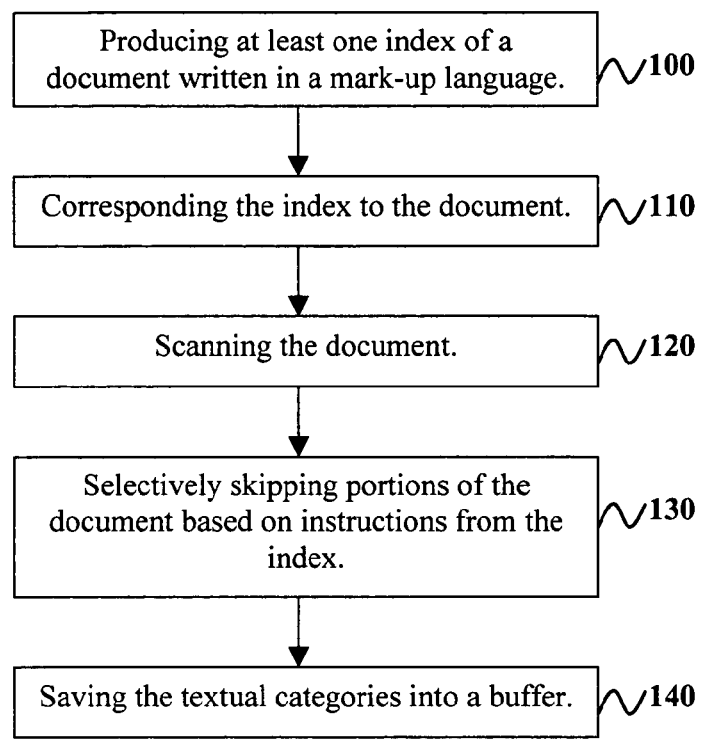
FIG. 1 is a flow diagram illustrating a preferred method of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

Figure 2A:
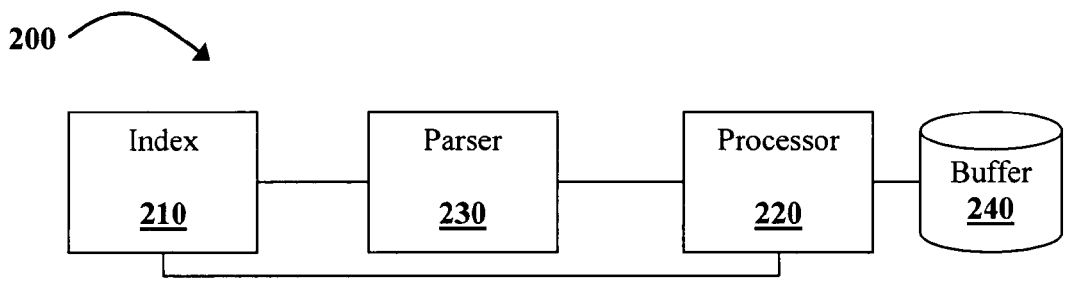
FIG. 2(*a*) is a system diagram according to an embodiment of the invention.
Figure 2B:
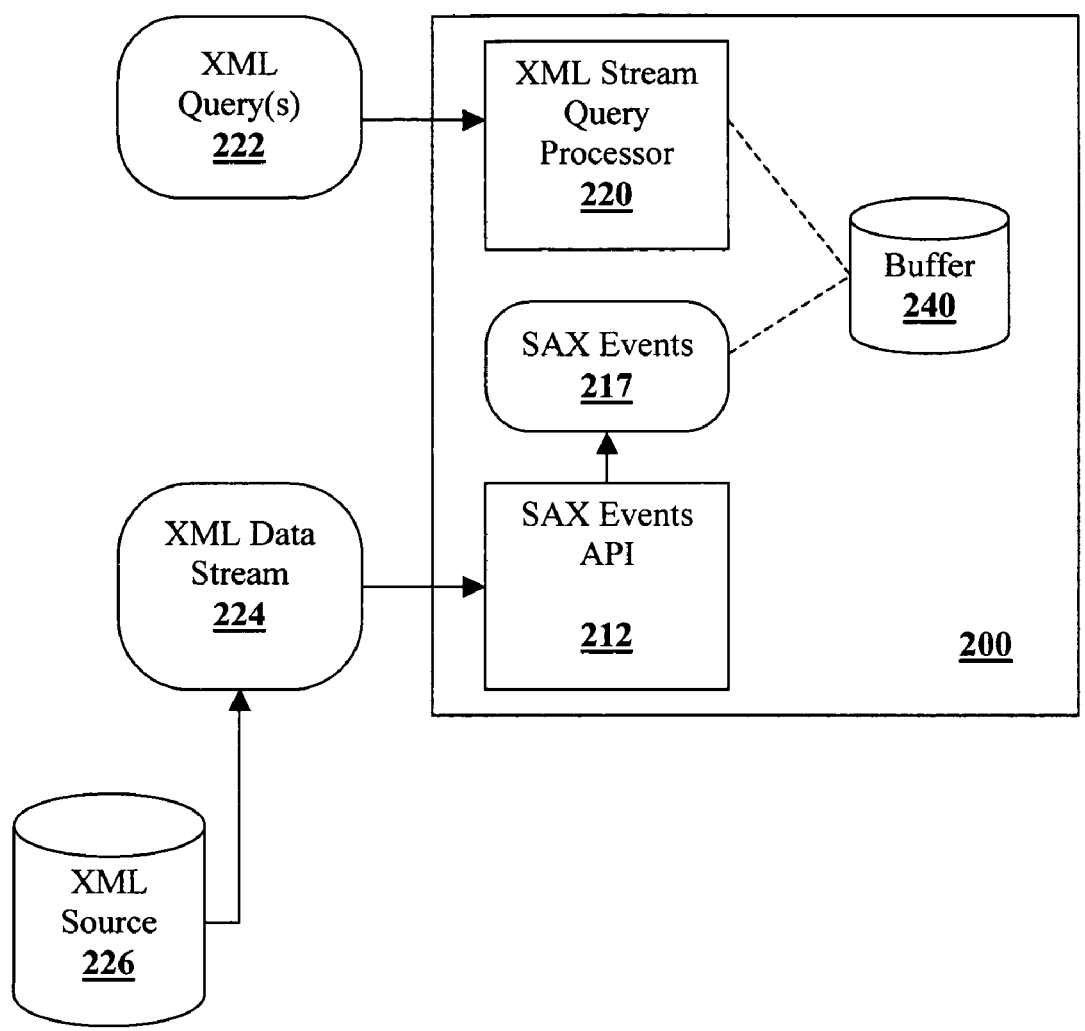
Figure 3:
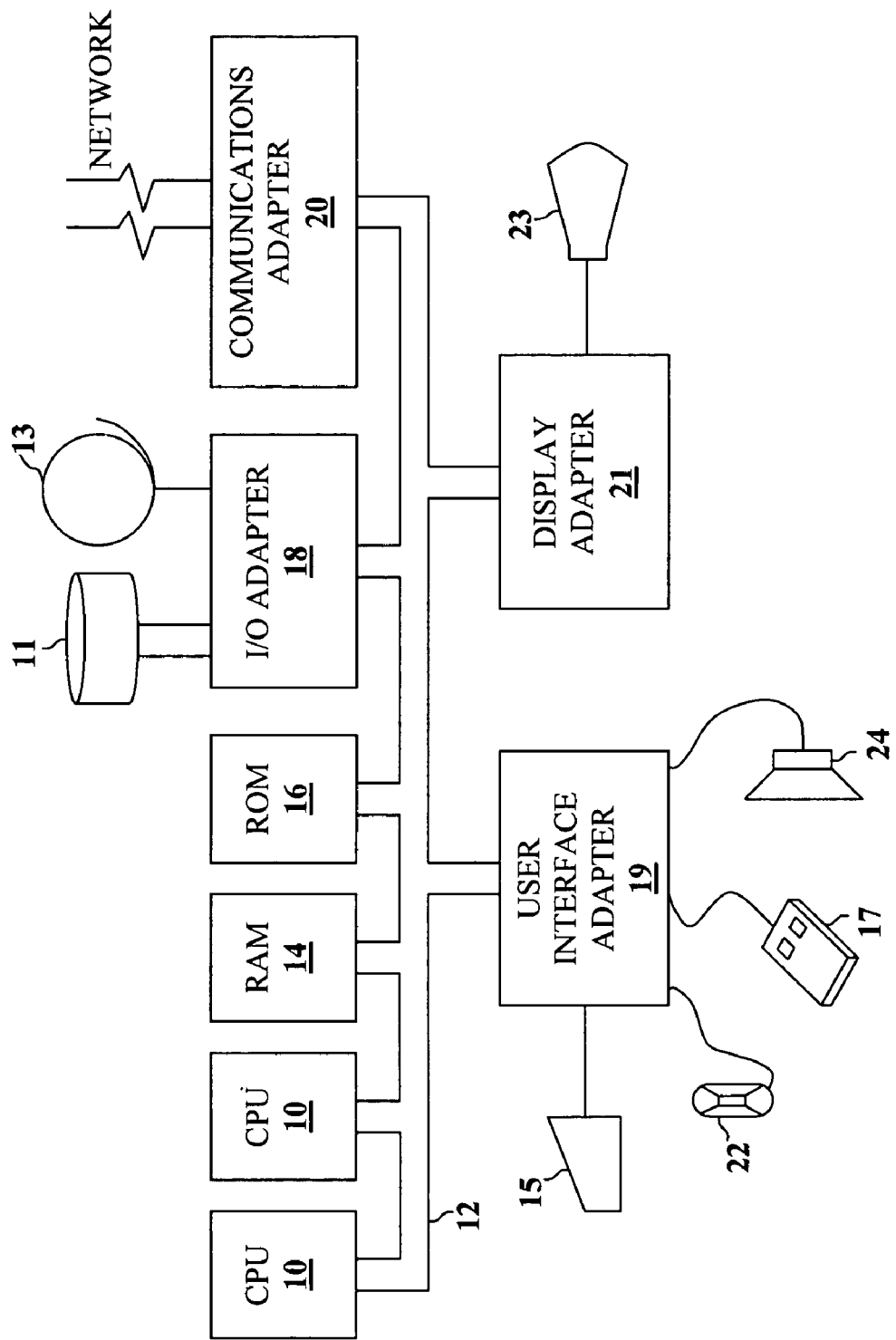
FIG. 3 is a system diagram according to an embodiment of the invention.

As mentioned, there is a need for a novel technique that can reduce parsing time in the context of processing XQuery queries over XML documents. Referring now to the drawings and more particularly to FIGS. 1 through 3, there are shown preferred embodiments of the invention.

FIG. 1 depicts a flowchart illustrating a method for parsing documents in query processing comprising producing 100 at least one index of a document written in a mark-up language, corresponding 110 the index to the document, scanning 120 the document, and selectively skipping 130 portions of the document based on instructions from the index. Furthermore, according to the invention, the mark-up language comprises any of HTML and XML; the skipped portions of the document comprise portions irrelevant to the query; the index comprises a plurality of elements representing textual categories of the query; and the instructions match the elements to the query. According to the invention, if the elements do not match the query, then the parser uses the index to skip the portions of the document corresponding to the unmatched elements. Moreover, each of the elements corresponds to a position in the document, wherein the position comprises an end position. Furthermore, the index uses the end position as a marker for determining where to resume scanning the document upon skipping the portions of the document. Additionally, the elements comprise sub-elements representing textual sub-categories of the query, wherein the sub-elements updates the position in the document upon skipping the portions of the document and resuming scanning of the document. The method further comprises saving 140 the textual categories into a buffer.

Moreover, as illustrated in FIG. 2(*a*) the invention provides a system 200 for efficiently parsing documents in query processing comprising at least one index 210 corresponding to a document written in a mark-up language, a processor 220 operable for scanning the document, and a parser 230 operable for selectively skipping portions of the document based on instructions from the index. Accordingly, if the elements do not match the query, then the parser 230 uses the index 210 to skip the portions of the document corresponding to the unmatched elements. Furthermore, the index 210 uses the end position as a marker for providing the processor 220 instructions for determining where to resume scanning the document upon the parser 230 skipping the portions of the document. The elements comprise sub-elements representing sub-categories of the query, wherein the sub-elements provide instructions for updating the position in the document upon the parser 230 skipping the portions of the document and the processor 220 resuming scanning of the document. The system 200 further comprises a buffer 240 operable for saving the textual categories.

More specifically an XML stream querying system 200 is shown in FIG. 2(*b*), wherein the XML stream querying system 200 receives one or more XML queries 222 for querying XML data stream 224. The XML stream querying system 200 processes the XML data stream 224 in a single pass. The XML stream querying system 200 may be implemented as a software program that can be run or executed on any type of computer system, such as the system shown in FIG. 3 (described below). Each XML query 222 may be comprised of standard XQuery/XPath expressions so that compatibility is maintained with existing standards.

Because XML stream querying system 200 is able to process XML data and evaluate one or more XML queries 222 in a single pass, the need to store large amounts of XML data is obviated (e.g., an entire document need not be stored). The result is that the XML data stream 24 may be processed as a dynamic stream originating from any source 226. For instance, XML data stream 224 may be processed as a continuous stream received over a network such as the Internet, from a wireless device, from a local or remote database, etc. XML data stream 224 may likewise originate from a more static source, such as a stored document. XML stream querying system 200 imports the XML data stream into a SAX events API 212, which are known in the art, to generate a set of SAX events 217. XML queries 222 are imported into the XML stream query processor 220, which is coupled to the buffer 240.

A representative hardware environment for practicing the present invention is depicted in FIG. 3, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

According to the invention intra-document indices can be used to reduce parsing time in the context of processing XQuery queries over XML documents stored on disk and streamed into the system 200. The invention achieves this by using the indices 210 that, when added to the XML documents, aids the parser 230 in skipping pieces from the document and extracting result portions without first turning them into events and stringifying again.

In other words, the invention provides changes to the interface to the parser 230 (compared to conventional parsing systems) to allow the query processor 220 or application to take advantage of the skipping features provided by the invention. Several new functions are introduced to the SAX interface: skipElement( ), skipAndSaveElement( ), and getElementByteSize( ). The function skipElement( ) is called within the startElement( ) SAX handler and instructs the parser 230 to skip all events up to and including the end element event matching the currently processed startElement( ) event. The skipAndSaveElementO is similar to skipElemento except that it stores the textual content of the element into the provided buffer 240. The size of element is obtained using the third function, getElementByteSize( ). All of these operations are efficiently implemented using the index 210 as described below.

The index structure 210 allows the TurboX Path and other query processors to skip over fragments of the documents, which are not relevant to the query being evaluated. The index structure 210 comprises the end position and the number of sub-elements of each element in the document. The order of the entries in the index 210 corresponds to the order of the elements in the document to allow the application (TurboX-Path) to traverse the index in lock step with the input document.

An example of an index 210 used in the invention is provided below, for a sample XML document from the DBLP publication database.

XML Document:

```
<dblp>
    <proceedings key="conf/vldb/2000">
        <editor>Amr El Abbadi<editor>
        <editor>Michael L. Brodie.</editor>
        <editor>Sharma Chakravarthy</editor>
        <editor>Umeshwar Dayal</editor>
        <editor>Nabil Kamel<editor>
        <editor>Gunter Schlageter</editor>
        <editor>Kyu-Young Whang</editor>
        <title>VLDB 2000, Proceedings of 26th International Conference on Very Large
Data Bases, September 10-14, 2000, Cairo, Egypt</title>
        <publisher href="db/publishers/mkp.html">Morgan Kaufmann</publisher>
        <year>2000</year>
        <isbn>1-55860-715-3</isbn>
        <url>db/conf/vldb/vldb2000.html</url>
    </proceedings>
    <proceedings key="conf/vldb/2001">
        <editor>Peter M. G. Apers</editor>
        <editor>Paolo Atzeni</editor>
        <editor>Stefano Ceri</editor>
        <editor>Stefano Paraboschi/editor>
        <editor>Kotagiri Ramamohanarao</editor>
        <editor>Richard T. Snodgrass</editor>
        <title>VLDB 2001, Proceedings of 27th International Conference on Very Large
Data Bases, September 11-14, 2001, Roma, Italy</title>
        <publisher href="db/publishers/mkp.html">Morgan Kaufmann</publisher>
        <year>2001</year>
        <isbn>1-55860-804-4</isbn>
        <url>db/conf/vldb/vldb2001 .html</url>
    </proceedings>
</dblp>
```

Index:

| ELEMENT | END POS1TION | NUMBER OF CHILDREN |
|---|---|---|
| <dblp> | 1119 | 25 |
| <proceedings> | 571 | 12 |
| <editor> | 73 | 0 |
| <editor> | 107 | 0 |
| <editor> | 144 | 0 |
| <editor> | 176 | 0 |
| <editor> | 204 | 0 |
| <editor> | 239 | 0 |
| <editor> | 272 | 0 |
| <title> | 404 | 0 |
| <publisher> | 473 | 0 |
| <year> | 491 | 0 |
| <isbn> | 519 | 0 |
| <url> | 557 | 0 |
| <proceedings> | 1113 | 11 |
| <editor> | 642 | 0 |
| <editor> | 672 | 0 |
| <editor> | 702 | 0 |
| <editor> | 738 | 0 |
| <editor> | 777 | 0 |
| <editor> | 815 | 0 |
| <title> | 947 | 0 |
| <publisher> | 1016 | 0 |
| <year> | 1034 | 0 |

-continued

| ELEMENT | END POSITION | NUMBER OF CHILDREN |
|---------|--------------|---------------------|
| <isbn>  | 1060         | 0                   |
| <un>    | 1098         | 0                   |

In order to clarify the presentation the tag name is used in the ELEMENT column of the index but those skilled in the art would understand that tag IDs could be used. Using the above index as an example, the processing of the following query can be enhanced.

Query:
dblp/proceedings[@key="conf/vldb/2000"]//editor

Processing would proceed normally for the first of the two <proceedings> entries until the first <title> sub-element is found. All of the <editor> sub-elements would match the query and would be returned to the user. If the start element is <title>, then query processor would use the index and decide to skip that element, jumping to position 404 in the document and to the next entry of the index. The same would happen for the next four sub-elements: <publisher>, <year>, <isbn>, and <url>. The second <proceedings> element would be completely skipped, since it does not match the query (the year 2001 is in the second <proceedings> element, which does not match the year 2000 as in the first <proceedings> element. Consulting the index in the start element event of <proceedings key="conf/vldb/2001">, the query processor skips to document offset 1113 and it also skips the next 11 entries of the index.

In order to control the index size, the application may decide not to index certain portions of the document. In this example, if the application decides not to index the <proceedings> sub-elements the index would be:

| ELEMENT         | END POSITION | NUMBER OF CHILDREN |
|-----------------|--------------|---------------------|
| <dblp>          | 1119         | 2                   |
| <proceedings>   | 571          | 0                   |
| <proceedings>   | 1113         | 0                   |

Clearly, this is a much more compact index that still allows big jumps (and big performance improvements) for several queries. The invention works as follows: Every time the query processor receives a start event (query processing instructions), it advances the current position in the index 210. While processing the start event, if the application decides that the rest of the element can be skipped, it uses the information about the end position of the current element which is available in the current index entry to determine the position (in the input document) where the processor 230 should resume scanning the input. The information in the current index entry about the number of sub-elements of the current element is used to update the current position in the index 210. If the index entry indicates the current element has k sub-elements, the current position in the index 210 is advanced k positions. This step keeps the current position in the document and the index 210 synchronized from the application's viewpoint.

It should be readily understood by those skilled in the art that the above-described parsing technique for XML stream querying could be utilized in any XML environment. Moreover, it should be understood that the systems, functions, mechanisms, methods, and modules described herein could be implemented in hardware, software, or a combination of hardware and software. They may be implemented by any type of computer system or other apparatus adapted for carrying out the methods described herein. A typical combination of hardware and software could be a general-purpose compute system with a computer program that, when loaded and executed, controls the computer system such that it carries out the methods described herein. Alternatively, a specific use computer, containing specialized hardware for carrying out one or more of the functional tasks of the invention could be utilized. The invention can also be embedded in computer program product, which comprises all the features enabling the implementation of the methods and functions described herein, and which, when loaded in a computer system, is able to carry out these methods and functions. Computer program, software program, program product, program, or software, in the present context can mean any expression, in any language, code or notation, of a set of instructions intended to cause a system having an information processing capability to perform a particular function either directly or after either or both of the following: (a) conversion to another language, code or notation; and/or (b) reproduction in a different material form.

The invention provides an index that is added to a textual XML document or stream. As opposed to some conventional binary XML representations that require modifications of the document format (such as XTalk), according to the invention the original document is left unchanged. This has three major advantages. First, to extract a piece of the document, the processor 220 does not need to recreate the result XML from the binary format. The index 210 contains information that allows for efficient extraction of elements from the original document. Second, indexing only parts of the document can control the size of the index 210. In the non-indexed parts of the documents the processing would be the same as if there were no index, with no performance penalty. For example, this is especially useful in scenarios that there is a known limit on the query depth. Third, the invention does not require any changes in parsers not supporting the use of the index. While more efficient parsers can take advantage of this index and improve the performance, traditional parsers can simply ignore the index and function as intended. As mentioned, the conventional parsing systems and techniques do not use indexes to parse data, rather the conventional approaches simply read the entire document and emit events for every element. Conversely, the invention provides an index which allows a parser to not have to read the entire document, and rather to skip portions of the document which are irrelevant to the query. Obviously, the invention provides a much more streamlined and efficient approach to document parsing.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method for query processing by using a streaming application programming interface (API) for a mark-up language data stream of a textual document, said method comprising:

producing, by said streaming API for a mark-up language data stream, an ordered index of all textual elements corresponding to their order in said mark-up language data stream, said ordered index comprising tag identifiers and end positions corresponding to each of said all textual elements;

scanning, by a processor, all tag identifiers of said ordered index to determine if there exists a match between a query and any of said tag identifiers;

parsing a matched textual element, if a tag identifier, corresponding to said matched textual element, matches said query; and skipping an unmatched textual element for parsing, if a tag identifier, corresponding to said unmatched textual element, does not match said query.

2. The method of claim 1, all the limitations of which are incorporated herein by reference, wherein each of said textual elements comprises textual sub-elements, and each of said textual sub-elements comprised a tag identifier and an end position.

3. The method of claim 1, all the limitations of which are incorporated herein by reference, further comprising storing a parsed matched textual element in a buffer.

4. The method of claim 1, all the limitations of which are incorporated herein by reference, wherein upon said skipping of said unmatched textual element for parsing, said method further comprises offsetting said parser based upon an end position stored in said ordered index and corresponding to said unmatched textual element.

5. The method of claim 1, all the limitations of which are incorporated herein by reference, wherein said mark-up language data stream comprises HyperText Markup Language (HTML) or Extensible Markup Language (XML).

6. A system for query processing by using a streaming application programming interface (API) for a mark-up language data stream of a textual document, said system comprising:

an ordered index of all textual elements corresponding to their order in said mark-up language data stream, said ordered index comprising tag identifiers and end positions corresponding to each of said all textual elements and being produced by said streaming API for a mark-up language data stream;

a processor adapted to scan all tag identifiers of said ordered index to determine if there exists a match between a query and any of said tag identifiers; and a parser adapted to parse a matched textual element, if a tag identifier corresponding to said matched textual element, matches said query, and to skip an unmatched textual element for parsing, if a tag identifier, corresponding to said unmatched textual element, does not match said query.

7. The system of claim 6, all the limitations of which are incorporated herein by reference, wherein each of said textual elements comprises textual sub-elements, and each of said textual sub-elements comprising a tag identifier and an end position.

8. The system of claim 6, all the limitations of which are incorporated herein by reference, further comprising a buffer, operatively connected to said parser, in which a parsed matched textual element is stored.

9. The system of claim 6, all the limitations of which are incorporated herein by reference, wherein said parser is offset based upon an end position stored in said ordered index that corresponds to said unmatched textual element.

10. The system of claim 6, all the limitations of which are incorporated herein by reference, wherein said mark-up language data stream comprises HyperText Markup Language (HTML) or Extensible Markup Language (XML).

11. A program storage device readable by computer comprising a program of instructions executable by said computer to perform a method for query processing by using a streaming application programming interface (API) for a mark-up language data stream of a textual document, said method comprising:

producing, in said streaming API for a mark-up language data stream, an ordered index of all textual elements corresponding to their order in said mark-up language data stream, said ordered index comprising tag identifiers and end positions corresponding to each of said all textual elements;

scanning, by a processor, all tag identifiers of said ordered index to determine if there exists a match between a query and any of said tag identifiers;

parsing a matched textual element, if a tag identifier, corresponding to said matched textual element, matches said query; and skipping an unmatched textual element for parsing, if a tag identifier, corresponding to said unmatched textual element, does not match said query.

12. The program storage device of claim 11, all the limitations of which are incorporated herein by reference, wherein each of said textual elements comprises textual sub-elements, and each of said textual sub-elements comprises a tag identifier and an end position.

13. The program storage device of claim 11, all the limitations of which are incorporated herein by reference, further comprising storing a parsed matched textual element in a buffer.

14. The program storage device of claim 11, all the limitations of which are incorporated herein by reference, wherein upon said skipping if said unmatched textual element for parsing, said method further comprises offsetting said parser based upon an end position stored in said ordered index and corresponding to said unmatched textual element.

15. The program storage device of claim 11, all the limitations of which are incorporated herein by reference, wherein said mark-up language data stream comprises HyperText Markup Language (HTML) or Extensible Markup Language (XML).

16. A system for query processing by using a streaming application programming interface (API) for a mark-up language data stream of a textual document, said system comprising:

an ordered index of all textual elements corresponding to their order in said mark-up language data stream, said ordered index comprising tag identifiers and end positions corresponding to each of said all textual elements and being produced by said streaming API for a mark-up language data stream;

a processor adapted to scan all tag identifiers of said ordered index to determine if there exists a match between a query and any of said tag identifiers; and a parser adapted to skip an unmatched textual element, if a tag identifier, corresponding to said unmatched textual element, does not match said query.

17. The system of claim 16, all the limitations of which are incorporated herein by reference, wherein each of said textual elements comprises textual sub-elements, and each of said textual sub-elements comprising a tag identifier and an end position.

18. The system of claim 16, all the limitations of which are incorporated herein by reference, further comprising a buffer, operatively connected to said parser, in which a parsed matched textual element is stored.

19. The system of claim 16, all the limitations of which are incorporated herein by reference, wherein said parser is offset based upon an end position stored in said ordered index that corresponds to said unmatched textual element.

20. The system of claim 16, all the limitations of which are incorporated herein by reference, wherein said mark-up language data stream comprises HyperText Markup Language (HTML) or Extensible Markup Language (XML).

\* \* \* \* \*